(12) United States Patent
Urakawa

(10) Patent No.: US 9,513,717 B2
(45) Date of Patent: Dec. 6, 2016

(54) INPUT DEVICE AND COMPUTER-READABLE STORAGE MEDIUM STORING INPUT PROGRAM FOR THE INPUT DEVICE

(71) Applicant: Yutaka Urakawa, Nagoya (JP)

(72) Inventor: Yutaka Urakawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 190 days.

(21) Appl. No.: 13/767,203

(22) Filed: Feb. 14, 2013

(65) Prior Publication Data

US 2013/0234936 A1    Sep. 12, 2013

(30) Foreign Application Priority Data

Mar. 12, 2012 (JP) ................................. 2012-054291

(51) Int. Cl.
*G06F 3/033* (2013.01)
*G06F 3/041* (2006.01)
(Continued)

(52) U.S. Cl.
CPC ............... *G06F 3/033* (2013.01); *G06F 3/041* (2013.01); *G06F 3/04842* (2013.01);
(Continued)

(58) Field of Classification Search
CPC combination set(s) only.
See application file for complete search history.

(56) References Cited

U.S. PATENT DOCUMENTS 5,796,406 A * 8/1998 Shigematsu .......... G06F 3/0481
345/173
7,774,753 B1 * 8/2010 Reilly et al. .................. 717/120
(Continued)

FOREIGN PATENT DOCUMENTS

CN    101356491 A    1/2009
CN    102331907 A    1/2012
(Continued)

OTHER PUBLICATIONS

Chinese Office Action dated Jul. 24, 2015 issued in corresponding Chinese Patent Application No. 201310078606.2.
(Continued)

*Primary Examiner* — Dwayne Bost
*Assistant Examiner* — Robert Michaud
(74) *Attorney, Agent, or Firm* — Scully, Scott, Murphy & Presser, PC

(57) ABSTRACT

An input device, including: an input acceptance portion configured to accept an input with respect to a display; and a controller configured to perform: a processing selecting process in which at least one processing is selected from among a plurality of executable processing on the basis of a movement direction of a continuous input from a start position, where the input acceptance portion accepts the continuous input; a processing-range setting process in which a range specified by the start position and an end position in the continuous input is set as a processing range for the at least one processing selected in the processing selecting process, where the input acceptance portion accepts the continuous input; and a processing executing process in which the at least one processing selected in the processing selecting process is executed with respect to data in the processing range set in the processing-range setting process.

15 Claims, 9 Drawing Sheets

(51) Int. Cl.
*G06F 3/0488* (2013.01)
*G06F 3/0484* (2013.01)
*H04N 1/00* (2006.01)

(52) U.S. Cl.
CPC ..... *G06F 3/04883* (2013.01); *H04N 1/00411* (2013.01); *H04N 2201/0094* (2013.01)

(56) References Cited

U.S. PATENT DOCUMENTS

| | | | |
|---|---|---|---|
| 2007/0115264 A1 | 5/2007 | Yu et al. | |
| 2007/0177804 A1* | 8/2007 | Elias et al. | 382/188 |
| 2008/0316183 A1* | 12/2008 | Westerman et al. | 345/173 |
| 2010/0199226 A1* | 8/2010 | Nurmi | 715/863 |
| 2011/0219323 A1* | 9/2011 | Woo | G06F 3/02 715/769 |
| 2012/0023399 A1 | 1/2012 | Hoshino et al. | |
| 2012/0030566 A1* | 2/2012 | Victor | 715/702 |
| 2013/0047100 A1* | 2/2013 | Kroeger et al. | 715/760 |
| 2013/0050278 A1* | 2/2013 | Watari et al. | 345/676 |
| 2013/0080979 A1* | 3/2013 | Weir | G06F 3/033 715/856 |
| 2013/0187856 A1* | 7/2013 | Konno et al. | 345/163 |
| 2013/0257782 A1* | 10/2013 | Nakagawa | 345/173 |

FOREIGN PATENT DOCUMENTS

| | | |
|---|---|---|
| JP | 2004-334300 A | 11/2004 |
| JP | 2006-244048 A | 9/2006 |
| JP | 2011-170603 A | 9/2011 |

OTHER PUBLICATIONS

Japanese Office Action dated Feb. 23, 2016 received in corresponding Japanese Patent Application No. 2012-054291.

* cited by examiner

FIG.2A

| KIND OF DATA | FORWARD DIRECTION | | REVERSE DIRECTION | |
|---|---|---|---|---|
| | FIRST RANK IN PRIORITY ORDER | SECOND RANK IN PRIORITY ORDER | FIRST RANK IN PRIORITY ORDER | SECOND RANK IN PRIORITY ORDER |
| HORIZONTAL WRITING | DOWNWARD | RIGHTWARD | UPWARD | LEFTWARD |
| VERTICAL WRITING | LEFTWARD | DOWNWARD | RIGHTWARD | UPWARD |

FIG.2B

| DIRECTION | PROCESSING TO BE EXECUTED |
|---|---|
| FORWARD DIRECTION | COPYING PROCESSING |
| REVERSE DIRECTION | DELETION PROCESSING |

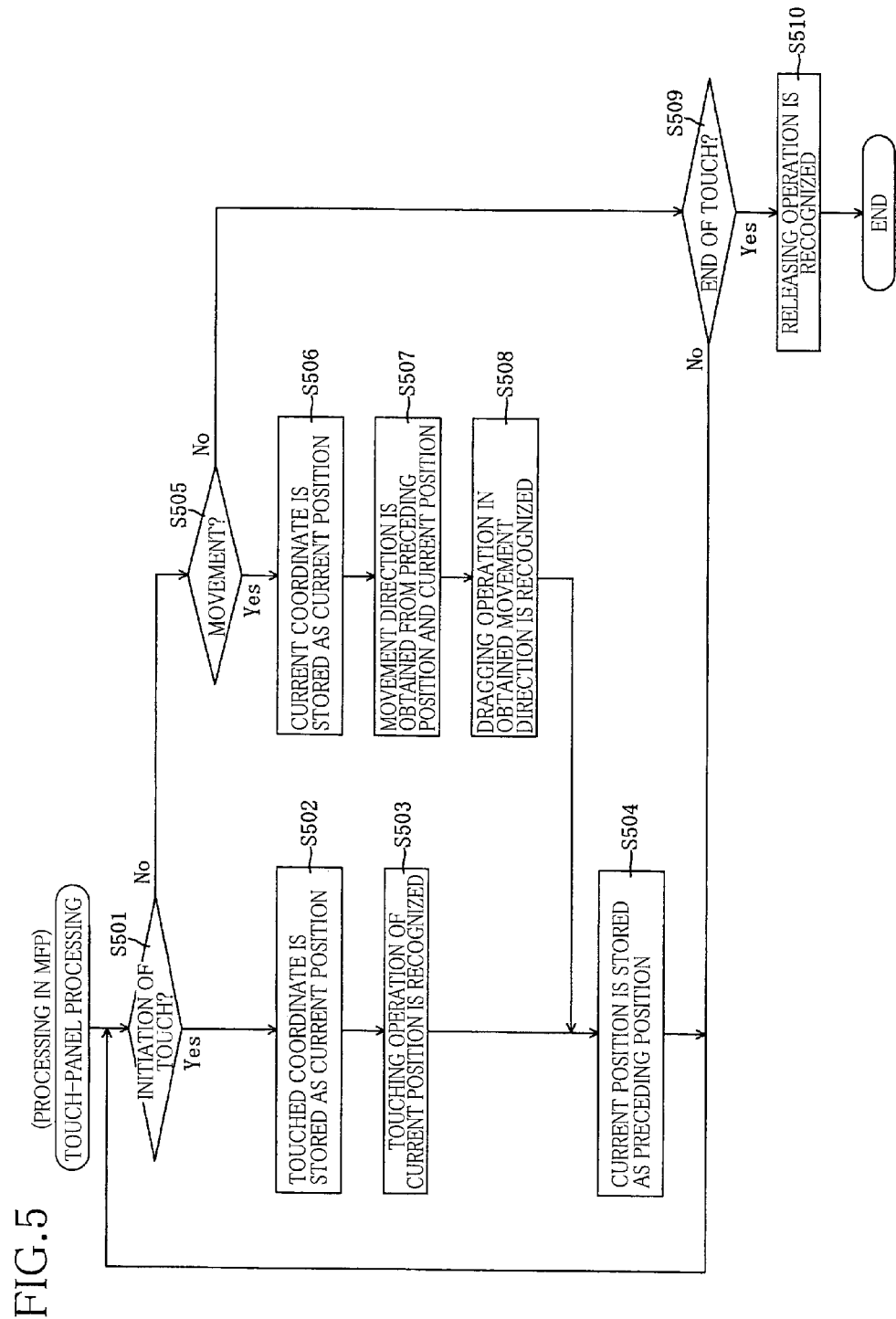

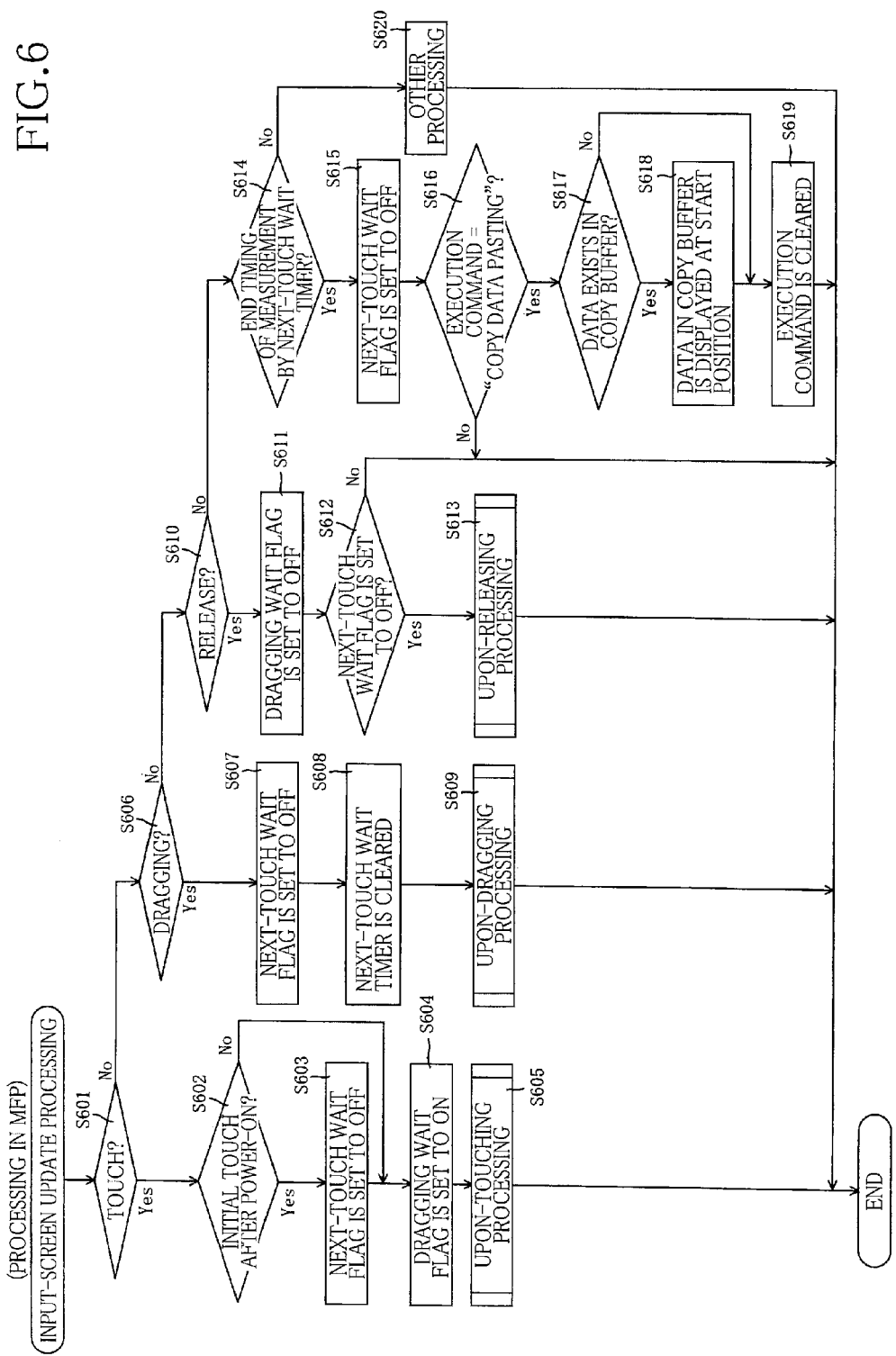

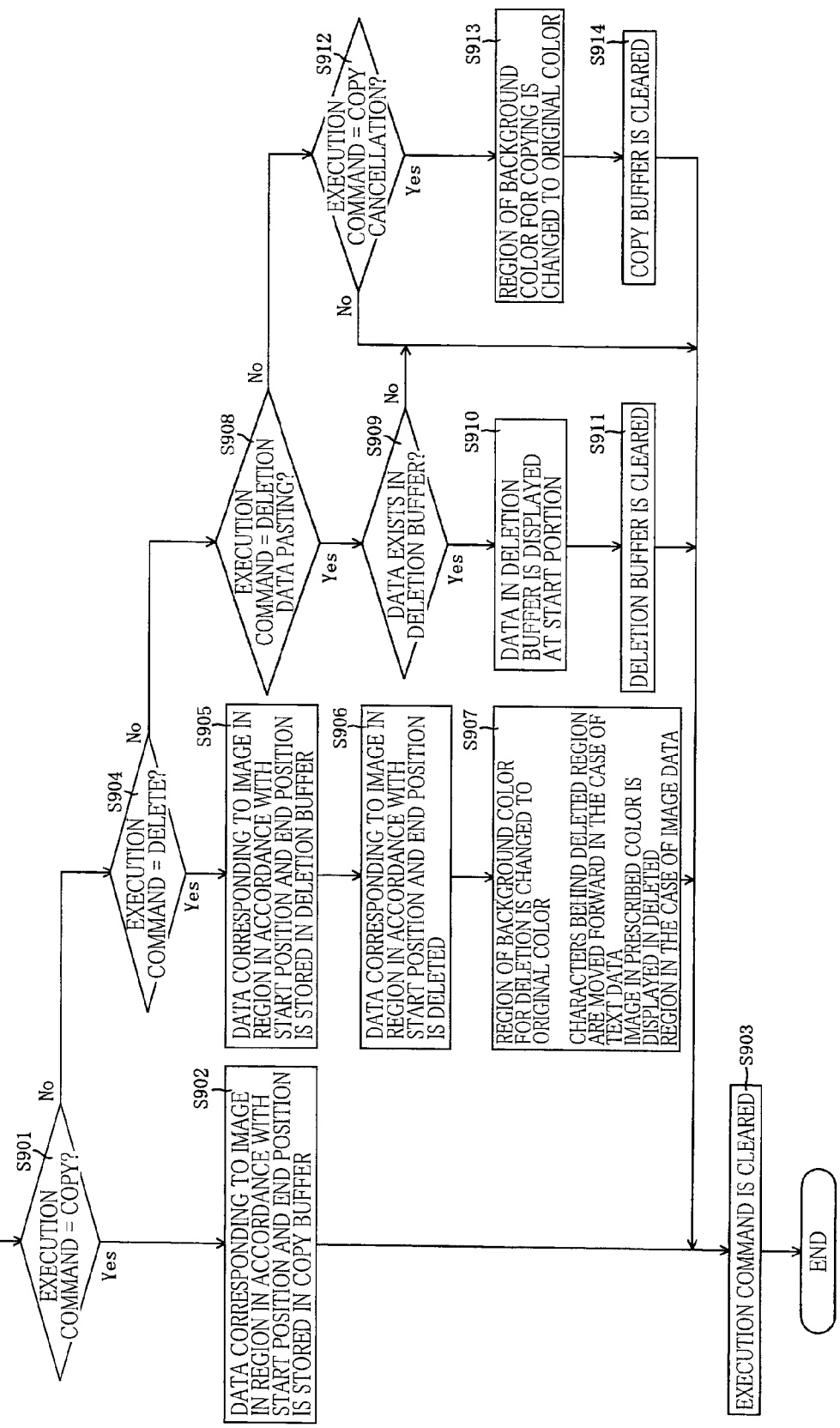

INPUT DEVICE AND COMPUTER-READABLE STORAGE MEDIUM STORING INPUT PROGRAM FOR THE INPUT DEVICE

CROSS REFERENCE TO RELATED APPLICATION

The present application claims priority from Japanese Patent Application No. 2012-054291, which was filed on Mar. 12, 2012, the disclosure of which is herein incorporated by reference in its entirety.

BACKGROUND

Field of the Invention

The present invention relates to an input device and a computer-readable storage medium storing an input program for the input device.

Description of Related Art

There is conventionally known a processing device configured to edit data displayed on a display screen, using a pointer such as a mouse or a finger. In a data processing device, where a part of a character string in document data displayed on a display screen is selected for range specification by a dragging operation, a plurality of processing items (such as copy and cut) to be executable on the range-specified data are displayed at the same time when the dragging operation is terminated. In this way, a user is permitted to choose a desired processing item. The data processing device executes processing corresponding to the processing item chosen by the user with respect to the range-specified data.

SUMMARY

In the data processing device described above, for executing processing with respect to the data that is being displayed, it is needed to carry out the choosing operation to choose a processing item to be performed, after the range specifying operation in which a range of data as a processing target is specified. Accordingly, the number of operations carried out by the user is increased, causing a risk that operations become complicated or cumbersome. In particular, the larger the number of processing items that can be chosen, the more complicated the choosing operation to choose a desired processing items from among a large number of processing items.

The present invention has been developed in view of the situations described above. It is a first object of the invention to provide an input device in which is enhanced the operability for permitting desired processing to be executed with respect to data that is being displayed. It is a second object of the invention to provide a computer-readable storage medium storing an input program for the input device.

The first object indicated above may be attained according to a first aspect of the invention, which provides an input device, comprising:

an input acceptance portion configured to accept an input with respect to a display; and a controller configured to perform:

a processing selecting process in which at least one processing is selected from among a plurality of executable processing based on a movement direction of a continuous input from a start position, where the input acceptance portion accepts the continuous input;

a processing-range setting process in which a range specified by the start position and an end position in the continuous input is set as a processing range for the at least one processing selected in the processing selecting process, where the input acceptance portion accepts the continuous input; and a processing executing process in which the at least one processing selected in the processing selecting process is executed with respect to data in the processing range set in the processing-range setting process.

It is noted that the present invention may be embodied in various forms such as a method of controlling the input device, a control device for controlling the input device, an input program for controlling the input device, and a record medium in which the input program is recorded.

The first object indicated above may be also attained according to a second aspect of the invention, which provides an input device, comprising:

a touch panel overlaid on a display and configured to accept an input to the display; and a controller configured to execute a control by receiving signals from the touch panel, wherein the controller is configured to: select at least one processing from among a plurality of executable processing based on a movement direction of a continuous input from a start position, where the touch panel accepts the continuous input; set a range specified by the start position and an end position in the continuous input as a processing range for the selected at least one processing, where the touch panel accepts the continuous input; and execute the selected at least one processing with respect to the data in the set processing range.

The second object indicated above may be attained according to a third aspect of the invention, which provides a computer-readable storage medium in which is stored an input program to be executed by a computer of an input device having an input acceptance portion configured to accept an input with respect to a display, wherein the input program permits the computer to function as a controller to perform:

a processing selecting process in which at least one processing is selected from among a plurality of executable processing based on a movement direction of a continuous input from a start position, where the input acceptance portion accepts the continuous input;

a processing-range setting process in which a range specified by the start position and an end position in the continuous input is set as a processing range for the at least one processing selected in the processing selecting process, where the input acceptance portion accepts the continuous input; and a processing executing process in which the at least one processing selected in the processing selecting process is executed with respect to data in the processing range set in the processing-range setting process.

BRIEF DESCRIPTION OF THE DRAWINGS

The above and other objects, features, advantages and technical and industrial significance of the present invention will be better understood by reading the following detailed description of embodiments of the invention, when considered in connection with the accompanying drawings, in which:

FIG. 2A is schematically shows details of a direction determination table and FIG. 2B schematically shows details of a processing determination table:

FIG. 5 is a flow chart showing touch-panel processing;

FIG. 6 is a flow chart showing input-screen update processing;

FIG. 9 is a flow chart showing upon-releasing processing.

DETAILED DESCRIPTION OF THE EMBODIMENT

Figure 1:
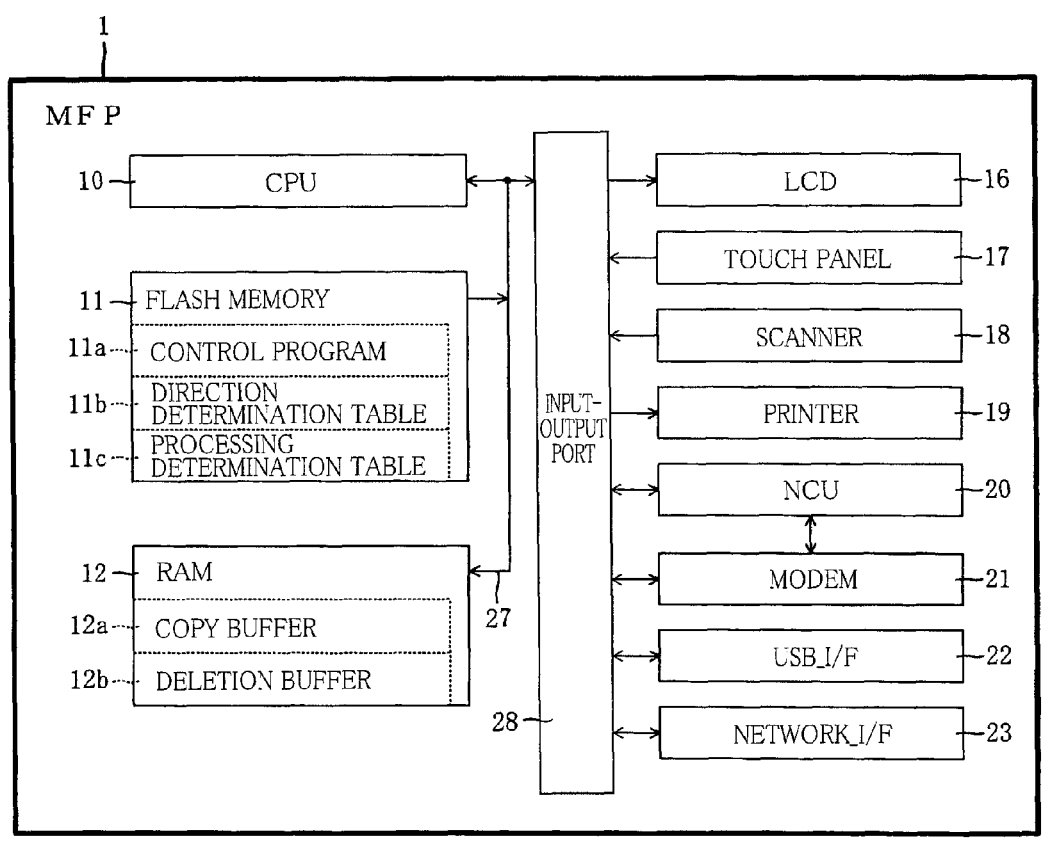
FIG. 1 is a block diagram showing an electric structure of an MFP according to one embodiment of the invention.

There will be hereinafter explained one embodiment of the present invention with reference to the drawings. FIG. 1 is a block diagram showing an electric structure of a multi-function peripheral 1 (hereinafter referred to as "MFP" where appropriate) as an input device according to one embodiment of the present invention. The MFP 1 has various functions such as a facsimile (FAX) function, a scanning function, a printing function, and an e-mail transmitting and receiving function. The present MFP 1 is configured such that processing to be executed with respect to data displayed on an LCD 16 is selectable in accordance with a movement direction, from a start position, of a continuous input (dragging) with respect to a touch panel 17.

The MFP 1 mainly has a CPU 10, a flash memory 11, a RAM 12, the LCD 16, the touch panel 17, a scanner 18, a printer 19, an NCU 20, a modem 21, a USB_I/F (USB interface) 22, and a network_I/F (network interface) 23. The CPU 10, the flash memory 11, and the RAM 12 are connected to each other via a bus line 27. The LCD 16, the touch panel 17, the scanner 18, the printer 19, the NCU 20, the modem 21, the USB_I/F 22, and the network_I/F (network interface) 23, and the bus line 27 are connected to each other via an input-output port 28.

The CPU 10 controls various functions of the MFP 1 and various portions connected to the input-output port 28 according to fixed values and programs stored in the flash memory 11, data stored in the RAM 12, or various signals transmitted and received via the NCU 20.

The flash memory 11 is a nonvolatile memory and stores a control program 11a etc., for controlling operations of the MFP 1. The following processing shown by flow charts of FIGS. 5-9 (that will be explained) is executed by the CPU 10 according to the control program 11a. Further, in the flash memory 11, a direction determination table 11b and a processing determination table 11c are stored. The direction determination table 11b and the processing determination table 11c will be later explained with reference to FIG. 2A and FIG. 2B, respectively.

The RAM 12 is a rewritable, volatile memory having a temporary area in which various data is temporarily stored when the CPU 10 executes the control program 11a. In the temporary area of the RAM 12, a copy buffer 12a and a deletion buffer 12b are provided. When copying processing or deletion processing is executed with respect to data displayed on the LCD 16, data in a processing range for the copying processing or the deletion processing is temporarily stored in a corresponding one of the copy buffer 12a and the deletion buffer 12b. The copy buffer 12a and the deletion buffer 12b are cleared when the MFP 1 is turned on or when a prescribed clearing processing is executed. Every time the copying processing or the deletion processing is executed, data in a corresponding one of the copy buffer 12a and the deletion buffer 12b is overwritten with new one.

The LCD 16 is a liquid crystal display device. The touch panel 17 is overlaid on a screen of the LCD 16. When a pointer such as a finger or a stick touches or approaches the screen of the LCD 16, the touch panel 17 detects the touch or the approached position. The scanner 18 is configured to read a document and converts the read document into image data. The printer 19 is configured to print an image based on the image data on a recording sheet. The modem 21 is configured to modulate, upon FAX transmission, image data to be transmitted into signals that can be transmitted to a telephone network (not shown) and to transmit the signals via the NCU 20, and the modem 21 is configured to demodulate signals inputted thereto from the telephone network via the NCU 20 into image data. The NCU 20 is for connecting the telephone network (not shown) and the MFP 1 and is configured to control a connection state of the MFP 1 and the telephone network by connecting the line or cutting the line according to a command from the modem 21. The USB_I/F 22 is for connecting other device such as a personal computer to the MFP 1 for enabling communication therebetween via a USB cable and is constituted by a known device. The network_I/F 23 is an interface for connecting the MFP 1 to the Internet or LAN not shown.

FIG. 2A schematically shows details of the direction determination table 11b. The direction determination table 11b is a table for determining whether a movement direction of a continuous input with respect to the touch panel 17 (hereinafter simply referred to as the "continuous input" where appropriate) from a start position is a forward direction or a reverse direction. Here, the movement direction of the continuous input means a direction in which a position at which the continuous input is being accepted moves. As shown in FIG. 2A, the direction determination table 11b includes areas 11b1-11b3. In the area 11b1, a kind of data (data kind) is stored. In the example of FIG. 2A, there is stored, in the area 11b1, text data in horizontal writing (horizontal writing) and text data in vertical writing (vertical writing) are stored as the data kind. Where the forward direction is referred to as a first direction, the reverse direction is referred to as a second direction opposite to the first direction.

In the area 11b2, movement directions of the continuous input from the start position each of which is judged to be the forward direction are stored in relation to the data kind stored in the area 11b1. In the area 11b3, movement directions of the continuous input from the start position each of which is judged to be the reverse direction are stored in relation to the data kind stored in the area 11b1. In the example of FIG. 2A, "downward" and "rightward" are stored in the area 11b2 each as the forward direction in the horizontal writing while "leftward" and "downward" are stored in the area 11b2 each as the forward direction in the vertical writing. In the area 11b2a, "upward" and "leftward" are stored each as the reverse direction in the horizontal writing while "rightward" and "upward" are stored each as the reverse direction in the vertical writing. That is, the forward direction and the reverse direction are defined as mutually opposite directions. In the present specification, "upward", "downward", "leftward", and "rightward" indicate respective directions when a user sees the LCD 16 (the touch panel 17).

That is, in this example, where the data kind is the horizontal writing, the movement direction to be judged as the forward direction is "downward" direction or "rightward" direction while the movement direction to be judged as the reverse direction is "upward" direction or "leftward" direction. Accordingly, in the case of the horizontal writing, where the movement direction of the continuous input from the start position is "downward" or "rightward", the movement direction is judged to be the forward direction. Where the movement direction is "upward" or "leftward", the movement direction is judged to be the reverse direction. On the other hand, where the data kind is the vertical writing, the movement direction to be judged as the forward direction is "leftward" direction or "downward" direction while the movement direction to be judged as the reverse direction is "rightward" direction or "upward" direction. Accordingly, in the case of the vertical writing, where the movement direction of the continuous input from the start position is "leftward" or "downward", the movement direction is judged to be the forward direction. Where the movement direction is "rightward" or "upward", the movement direction is judged to be the reverse direction. In the present embodiment, for the continuous input with respect to the image data, the movement direction is judged to be the forward direction or the reverse direction in the same way as in the case of the horizontal writing in the direction determination table 11b.

In the area 11b2, there are provided an area 11b2a in which is stored a direction set as the first rank in a priority order and an area 11b2b in which is stored a direction set as the second rank in the priority order. Similarly, in the area 11b3, there are provided an area 11b3a in which is stored a direction set as the first rank in the priority order and an area 11b3b in which is stored a direction set as the second rank in the priority order. The first rank in the priority order has a higher priority degree than the second rank in the priority order. In the example shown in FIG. 2A, "downward" is stored in the area 11b2a and "rightward" is stored in the area 11b2b among the directions each stored, in the area 11b2, as the forward direction in the case of the horizontal writing. Further, "upward" is stored in the area 11b3a and "leftward" is stored in the area 11b3b among the directions each stored, in the area 11b3, as the reverse direction in the case of the horizontal writing. That is, in the case of the horizontal writing, the direction set as the first rank in the priority order is the upward direction or the downward direction, and the direction set as the second rank in the priority order is the rightward direction or the leftward direction. On the other hand, "leftward" is stored in the area 11b2a and "downward" is stored in the area 11b2b among the directions each stored, in the area 11b2, as the forward direction in the case of the vertical writing. Further, "rightward" is stored in the area 11b3a and "upward" is stored in the area 11b3b among directions each stored, in the area 11b3, as the reverse direction in the case of the vertical writing. That is, in the case of the vertical writing, the direction set as the first rank in the priority order is the leftward direction or the rightward direction, and the direction set as the second rank in the priority order is the upward direction or the downward direction. The priority degrees set respectively for the upward direction, the downward direction, the rightward direction, and the leftward direction are stored for each kind of the data. Therefore, on the basis of the kind of the data and the priority degree, it is possible to appropriately judge where the movement direction of the continuous input from the start position is the forward direction or the reverse direction.

The priority order is referred to when the movement direction of the continuous input from the start position is an oblique direction having an up-and-down direction component and a left-and-right direction component. Accordingly, where the movement direction of the continuous input with respect to data in the horizontal writing is the oblique direction, the movement direction is judged to be the forward direction or the reverse direction on the basis of the up-and-down direction component of the oblique direction. On the other hand, where the movement direction of the continuous input with respect to data in the vertical writing is the oblique direction, the movement direction is judged to be the forward direction or the reverse direction on the basis of the left-and-right direction component of the oblique direction. The horizontal writing has a characteristic that lines increase from the top to the bottom with an increase in characters. On the contrary, the vertical writing has a characteristic that lines increase from the right to the left with an increase in characters. Accordingly, where the judgment as to whether the movement direction of the continuous input in the oblique direction is the forward direction or the reverse direction is made on the basis of the up-and-down direction component in the case of the horizontal writing and on the basis of the left-and-right direction component in the case of the vertical writing, the judgment is made in conformity with the characteristic of the data in the case of horizontal writing and the characteristic in the case of vertical writing. Further, because the directions each of which is judged to be the forward direction or the reverse direction are stored in the direction determination table 11b in advance in relation to the data kind, it is possible to appropriately judge whether the movement direction of the continuous input from the start position is the forward direction or the reverse direction depending upon the data kind. The priority degrees set respectively for the upward direction, the downward direction, the rightward direction, and the leftward direction are stored for each kind of the data. Therefore, on the basis of the kind of the data and the priority degree, it is possible to appropriately judge where the movement direction of the continuous input from the start position is the forward direction or the reverse direction.

FIG. 2B schematically shows details of the processing determination table 11c. The processing determination table 11c is for determining processing to be executed respectively when the movement direction is the forward direction and when the movement direction is the reverse direction. As shown in FIG. 2B, the processing determination table 11c includes an area 11c1 and an area 11c2. In the area 11c1, there are stored directions (the forward direction and the reverse direction) determined by the direction determination table 11b. In the area 11c2, two sorts of processing to be executed are stored in relation to the directions stored in the area 11c1. In the example of FIG. 2B, the copying processing is set in relation to the forward direction while the deletion processing is set in relation to the reverse direction. Accordingly, in this example, where the movement direction of the continuous input from the start position is judged to be the forward direction on the basis of the direction determination table 11b, the copying processing is executed. On the other hand, where the movement direction of the continuous input from the start position is judged to be the reverse direction, the deletion processing is executed.

FIGS. 3A-3F are schematic views showing one example of processing executed with respect to image data displayed on the LCD 16.

Figure 3A:
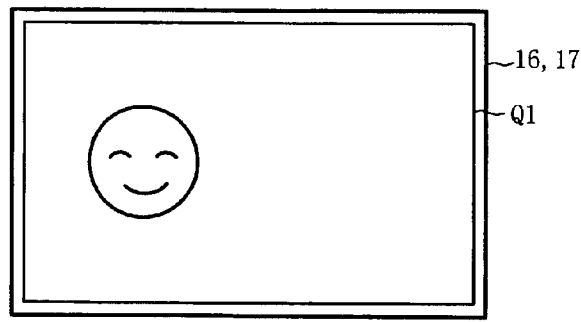
FIGS. 3A-3F are schematic views showing one example of processing executed with respect to image data.

FIG. 3A is a view showing a state in which image data as a processing target is displayed on the LCD 16. On the LCD 16, an image Q1 based on the image data as the processing target is displayed. A user can input a desired position in the image Q1 through the touch panel 17 by touching any position in the image Q1 by a pointer such as his/her finger. In the present embodiment, examples of the image data as the processing target include image data in the bitmap format scanned by the scanner 18 for facsimile transmission and image data in the bitmap format received by the facsimile function.

Figure 3B:
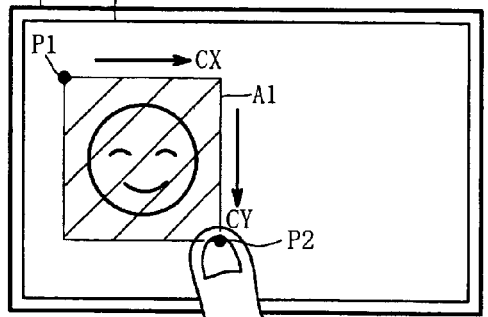
Figure 3C:
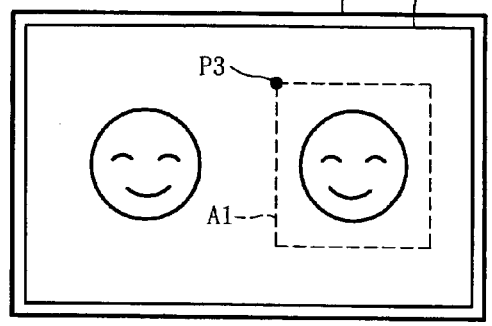

FIGS. 3B and 3C show an instance in which the copying processing is executed with respect to the image data as the processing target. In the case of the image data, there is set, as a processing range, a rectangular region in which two apexes of respective two opposite angles respectively correspond to a start position and an end position in the continuous input, on the basis of respective coordinates of the start position and the end position. Accordingly, in the example of FIG. 3B, there is set, as a processing range A1, a rectangular region in which two apexes of respective two opposite angles respectively correspond to a position P1 that is the start position of the continuous input and a position P2 that is the end position of the continuous input. In the meantime, as shown in FIG. 3B, where the route of the continuous input from the position P1 to the position P2 is composed of a movement from the position P1 in a rightward direction (i.e., in a direction indicated by an arrow CX) and a subsequent movement in a downward direction (i.e., in a direction indicated by an arrow CY), the movement direction of the continuous input from the start position (from the position P1) is "rightward". Accordingly, the movement direction is judged to be the forward direction on the basis of the direction determination table 11b. Hence, the copying processing is selected as processing with respect to the processing range A1, on the basis of the processing determination table 11c. When the copying processing is selected, a background color of the processing range A1 is changed to a background color for copying (e.g., yellow).

In the present embodiment, a termination time point of the continuous input (i.e., a termination time point of the touch by the pointer) corresponds to execution timing of the selected processing. Accordingly, when the user releases his/her finger at the position P2, the data in the processing range A1 is stored as the copy data in the copy buffer 12a and is copied. By single-tapping a desired position in the image Q1, the copy data is pasted (displayed) at the position. For instance, where a position P3 is single-tapped as shown in FIG. 3C after the copying processing of FIG. 3B, the copy data (the data in the processing range A1) is pasted at the position P3, and an image based on the data in the processing range A1 is displayed as a copy image at the position P3.

Figure 3D:
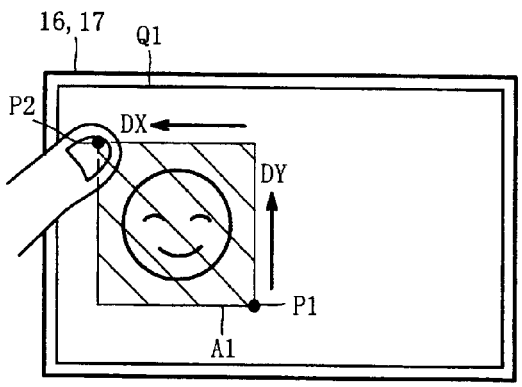
Figure 3E:
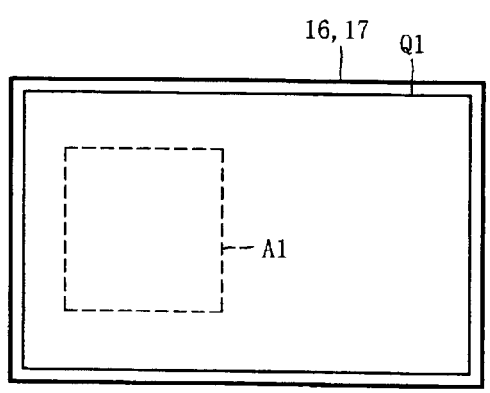
Figure 3F:
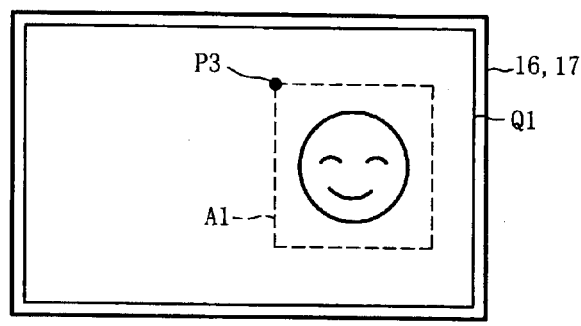

FIGS. 3D-3F show an instance in which the deletion processing is executed with respect to the image data as the processing target. As in the example of FIG. 3B, in the example of FIG. 3D, there is set, as a processing range A1, a rectangular region in which two apexes of respective two opposite angles respectively correspond to the start position (the position P1) and the end position (the position P2) of the continuous input. Further, where the route of the continuous input from the position P1 to the position P2 is composed of a movement from the position P1 in an upward direction (i.e., a direction indicated by an arrow DY) and a subsequent movement in a leftward direction (indicated by an arrow DX), the movement direction of the continuous input from the start position is "upward". Accordingly, the movement direction is judged to be the reverse direction on the basis of the direction determination table 11b. Hence, the deletion processing is selected as processing with respect to the processing range A1, on the basis of the processing determination table 11c. When the deletion processing is selected, a background color of the processing range A1 is changed to a background color for deletion (e.g., blue).

When the user releases his/her finger at the position P2, the deletion processing is executed and the data in the processing range A1 is deleted, so that an image based on the data in the processing range A1 is deleted, as shown in FIG. 3E. In the present embodiment, where the deletion processing with respect to the image data is executed, image data is added such that an image in a prescribed color is displayed in the processing range as the deletion target as a result of deletion of the data. Therefore, it is possible to prevent an image from being displayed such that a deleted part (corresponding to the processing range with respect to which the deletion processing has been executed) is missing or absent like a hole. In this regard, the color of the image data to be added is preferably the same color as a surrounding range that surrounds the processing range on which the deletion processing has been executed. Where the color of the surrounding range is not a single color, the color of the image data to be added is determined to be a color obtaining by averaging colors (pixel values) of the surrounding range or a color specified in accordance with the averaged color, for instance. Further, in the present embodiment, where the deletion processing is executed, the data in the processing range A1 is stored as the deletion data in the deletion buffer 12b. By double-tapping a desired position in the image Q1, the deletion data is pasted at the position, as shown in FIG. 3F.

In each of FIGS. 3B and 3D, the route of the continuous input from the position P1 to the position P2 is a two-step route. More specifically, in FIG. 3B, the route is composed of a portion extending in the rightward direction and a portion extending in the downward direction. In FIG. 3D, the route is composed of a portion extending in the upward direction and a portion extending in the leftward direction. The route may extend from the position P1 to the position P2 in an oblique direction. For instance, in FIG. 3B, even where the route of the continuous input from the position P1 to the position P2 extends from the position P1 to the position P2 in a lower right direction, the movement direction is judged to be the forward direction according to the determination table 11b. As a result, the copying processing is selected.

Figure 4A:
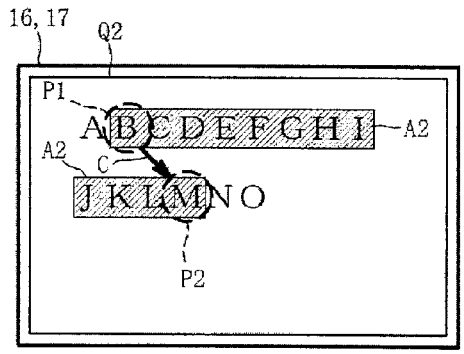
FIGS. 4A-4G are views showing one example of processing performed executed with respect to text data.
Figure 4B:
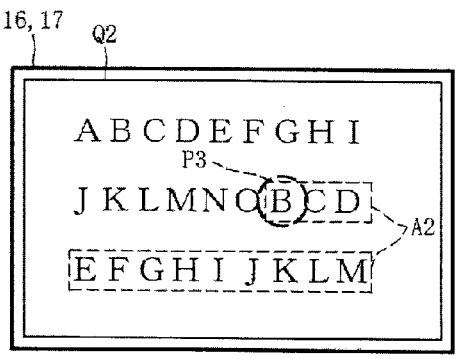
Figure 4C:
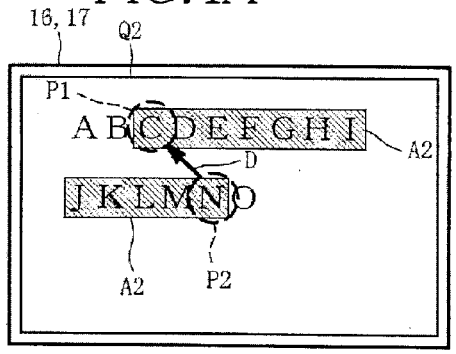
Figure 4D:
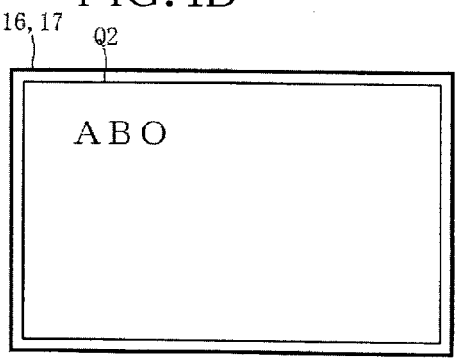
Figure 4E:
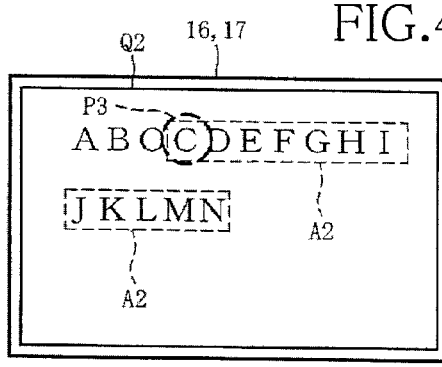

FIGS. 4A-4G are schematic views showing one example of processing executed with respect to text data (document data) displayed on the LCD 16. In the present embodiment, examples of the text data that can be a processing target include text data that is an e-mail body part. FIGS. 4A and 4B are views showing an instance in which the copying processing is executed with respect to the text data in the horizontal writing. FIGS. 4C-4E shows an instance in which the deletion processing is executed with respect to the text data in the horizontal writing. In the text data, a range in which characters between the start position and the end position inclusive are displayed is set as the processing range. Concretely, for each character in the text data that is being displayed on the LCD 16, more specifically, the text data that is being displayed in a text box Q2, there are stored information as to what number the character is from the top in the text and a displayed position (coordinate) of the character, in relation to each other. Accordingly, on the basis of the information, the range in which are displayed the characters sandwiched between the start position and the end position inclusive can be initially specified. Then, on the basis of the coordinate of the start position in the continuous input and the coordinate of the end position in the continuous input, it is judged what number the character at the start position is in the text and what number the character at the end position is in the text. On the basis of the judgment, the characters sandwiched between the character at the start position and the character at the end position are specified. On the basis of the specification, the range in which are displayed the characters sandwiched between the start position and the end position inclusive is set.

In the example of FIG. 4A, the continuous input is conducted by moving the finger as the pointer from the position P1 of the character "B" to the position P2 of the character "M" in a lower right direction (i.e., in a direction indicated by an arrow C). In this way, the range in which are displayed the characters sandwiched between the start position (the position P1) and the end position (the position P2) inclusive, is set as a processing range A2. According to the direction determination table 11b, the direction set as the first rank in the priority order in the case of the horizontal writing is the downward direction or the upward direction. Accordingly, where the movement direction of the continuous input from the start position is the lower right direction, the movement direction is judged to be the forward direction on the basis of the downward direction. Hence, the copying processing is selected as processing to be executed with respect to the processing range A2 on the basis of the processing determination table 11c. When the user releases his/her finger at the position P2, the copying processing is executed, and the data in the processing range A2 is stored as the copy data in the copy buffer 12a. Accordingly, the copying processing on the data can be easily executed. By single-tapping a desired position in the text box Q2, the copy data can be pasted (displayed) at the position. For instance, by single-tapping the position P3 as shown in FIG. 4B after execution of the copying processing of FIG. 4A, the copy data, namely, the data in the processing range A2, is pasted at the position P2. In this way, in the character string in the processing range A2, the first character "B" is displayed at the position P3, and the character string "CDEFGHIJKLM" in the processing range A2 that is subsequent to the character "B" is displayed behind the character "B".

In the meantime, in the example of FIG. 4C, the continuous input is conducted by moving the finger from the position P1 of the character "N" to the position P2 of the character "C" in an upper left direction (i.e., in a direction indicated by an arrow D). In this way, the range in which are displayed the characters sandwiched between the start position (the position P1) and the end position (the position P2) inclusive is set as the processing range A2. According to the direction determination table 11b, where the movement direction of the continuous input from the start position is the upper left direction, the movement direction is judged to be the reverse direction on the basis of the upward direction. Hence, the deletion processing is selected as processing to be executed with respect to the processing range A2 on the basis of the processing determination table 11c. When the user releases his/her finger at the position P2, the deletion processing is executed and the data in the processing range A2 is deleted. In the present embodiment, where there exists any subsequent character (any subsequent character string) that follows or that is behind the processing range, the characters that exist behind the processing range are displayed so as to be moved forward as a result of deletion of the data in the processing range. Accordingly, where the deletion processing of FIG. 4C is executed, the character "O" that exists behind the processing range A2 is moved forward and is displayed subsequent to the character "B" that is immediately before the processing range A2, as shown in FIG. 4D. Hence, it is possible to easily execute editing in which an unnecessary character string is deleted from the text that is being displayed.

Further, in the present embodiment, where the deletion processing is executed by releasing the finger at the position P2, the data in the processing range A2 is stored as the deletion data in the deletion buffer 12b. By double-tapping a desired position in the text box Q2, the deletion data is pasted (displayed) at the position. For instance, by double-tapping the position P3 as shown in FIG. 4E after execution of the deletion processing of FIG. 4C, the deletion data, namely, the data in the processing range A2, is pasted at the position P3. In this way, in the character string in the processing range A2, the first character "C" is displayed at the position P3, and the character string "DEFGHIJKLMN" in the processing range A2 that is subsequent to the character "C" is displayed behind the character "C".

Figure 4F:
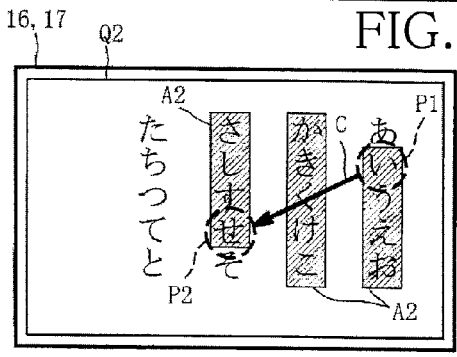
Figure 4G:
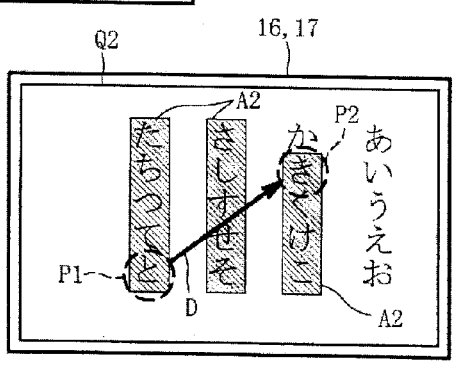

FIG. 4F is a view showing an instance in which the copying processing is executed with respect to the text data in the vertical writing while FIG. 4G is a view showing an instance in which the deletion processing is executed with respect to the text data in the vertical writing. In the example of FIG. 4F, the continuous input is conducted by moving the finger from the position P1 of the character "い" (the Japanese Hiragana character) to the position P2 of the character "せ" in a lower left direction (i.e., in a direction indicated by an arrow C). In this way, the range in which are displayed the characters sandwiched between the start position (the position P1) and the end position (the position P2) inclusive, is set as the processing range A2. According to the direction determination table 11b, the direction set as the first rank in the priority order in the case of the vertical writing is the leftward direction or the rightward direction. Accordingly, where the movement direction of the continuous input from the start position is the lower left direction, the movement direction is judged to be the forward direction on the basis of the leftward direction. Hence, the copying processing is selected as processing with respect to the processing range A2 on the basis of the processing determination table 11c. When the user releases his/her finger at the position P2, the copying processing is executed, and the data in the processing range A2 is stored as the copy data in the copy buffer 12a.

In the meantime, in the example of FIG. 4G, the continuous input is conducted by moving the finger from the position P1 of the character "と" to the position P2 of the character "き" in the upper right direction (i.e., in a direction indicated by an arrow D). In this way, the range in which are displayed the characters sandwiched between the start position (the position P1) and the end position (the position P2) inclusive, is set as the processing range A2. Where the movement direction of the continuous input from the start position (from the position P1) is the upper right direction, the movement direction is judged to be the reverse direction on the basis of the rightward direction. Hence, the deletion processing is selected as processing with respect to the processing range A2 on the basis of the processing determination table 11c. When the user releases his/her finger at the position P2, the deletion processing is executed, and the data in the processing range A2 is deleted. In this example, because there exist no subsequent characters behind the processing range, only deletion of the data is executed.

As explained with respect to the image data, in the text data, where the copying processing is selected, the background color of the processing range A2 is changed into the background color for copying. On the other hand, where the deletion processing is selected, the background color of the processing range A2 is changed into the background color for deletion.

By single-tapping a desired position in the text box Q2, the data (the copy data) stored in the copy buffer 12a by the copying processing is pasted (displayed) at the position. Where the deletion processing is executed with respect to the text data that is being displayed, the data in the processing range A2 is stored as the deletion data in the deletion buffer 12b. By double-tapping a desired position in the text box Q2, the deletion data is pasted at the position.

In FIG. 4, the route of the continuous input from the position P1 to the position P2 extends in the oblique direction. The route may be a two-step route composed of a portion extending in the upward direction or the downward direction and a portion extending in the leftward direction or the rightward direction. For instance, in FIG. 4A, even where the route of the continuous input from the position P1 to the position P2 is made as a two-step route composed of a portion extending in the downward direction and a portion extending in the rightward direction, the movement direction is judged to be the forward direction according to the direction determination table 11b, so that the copying processing is selected.

FIG. 5 is a flow chart showing touch-panel processing executed by the CPU 10 of the MFP 1. This processing is initiated when the touch panel 17 is touched by a pointer such as a finger, for instance. In step S501 (hereinafter "step" is omitted), the CPU 10 judges whether the touch panel 17 is touched from an untouched state, namely, the CPU 10 judges whether touch is initiated or not (S501). Where the CPU 10 recognizes initiation of touch (S501: Yes), the CPU 10 stores, in the RAM 12, the touched coordinate as a current position (S502) and recognizes a touching operation of the current position (S503). Next, the CPU 10 stores, in the RAM 12, the current position as a preceding position (S504) and returns the processing to S501. For instance, in FIG. 4A, where the finger touches the position P1, the CPU 10 executes the processing in S501-S503 and recognizes the touching operation of the position P1.

On the other hand, the CPU 10 does not recognize initiation of touch and recognizes a movement of the pointer on the touch panel 17 (S501: No, S505: Yes), the CPU 10 stores, in the RAM 12, a current coordinate as the current position (S506). Next, the CPU 10 obtains the movement direction from the preceding position and the current position (S507), recognizes a dragging operation in the obtained movement direction (S508), and returns the processing to S504. For instance, in FIG. 4A, where the finger is dragged from the position P1 to the position P2 in the lower right direction, the CPU 10 executes the processing in S505-S508 and recognizes the dragging operation from the position P1 to the position P2 in the lower right direction.

Where the CPU 10 does not recognize the movement of the pointer on the touch panel 17 and the CPU 10 judges that the pointer is not released from the touch panel 17, namely, the CPU 10 does not recognize end of touch (S505: No, S509: No), the CPU 10 moves the processing to S501. On the other hand, where the CPU 10 judges that the pointer is released from the touch panel 17, namely, the CPU 10 recognizes end of touch (S509: Yes), the CPU 10 judges the end of touch as a releasing operation (S510) and ends the present touch panel processing. For instance, in FIG. 4A, where the finger is released from the position P2, the CPU 10 executes the processing in S509 and S510 and recognizes the releasing operation.

FIG. 6 is a flow chart showing input-screen update processing executed by the CPU 10 of the MFP 1. This processing is for regularly monitoring an input status with respect to the touch panel 17 in an instance where the image data or the text data as the processing target is being displayed on the LCD 16. This processing is executed every 50 milliseconds (msec), for instance. It is noted that this processing is executed concurrently with the touch-panel processing of FIG. 5. In the touch-panel processing of FIG. 5, the touching operation is initially recognized. Where the touching operation is initial one after power-on of the MFP 1 (S601: Yes, S602:Yes), the CPU 10 sets a next-touch wait flag (not shown) provided in the RAM 12 to off (S603) and moves the processing to S604. The next-touch wait flag is for detecting a double tap as an execution command that commands execution of pasting of the deletion data. Where the next-touch wait flag is being set to on, it indicates waiting for a second-time touching operation. If the next-touch wait flag is configured to be automatically set to off every time the MPP 1 is turned on, the processing in S602-S603 may be omitted. On the other hand, where the detected touch is not initial one after power-on of the MFP 1 (S602: No), the CPU 10 moves the processing to S604. In S604, the CPU 10 sets a dragging wait flag (not shown) provided in the RAM 12 to on (S604). The dragging wait flag is for detecting initiation of the dragging operation. Where the dragging wait flag is being set to on, it indicates waiting for the continuous input (the dragging operation) subsequent to the touching operation. After S604, the CPU 10 executes processing upon touching (that will be later explained by referring to FIG. 7) (S605) and ends the present processing. Hereinafter, the processing upon touching will be referred to as the "upon-touching processing" where appropriate.

On the other hand, where not the touching operation but the dragging operation is recognized in the touch-panel processing of FIG. 5 (S601: No, S606: Yes), the CPU 10 sets the next-touch wait flag to off (S607) and clears a next-touch wait timer (not shown) (S608). The next-touch wait timer is provided for detecting a single tap for commanding execution of pasting of the copy data. Where the releasing operation is performed after the touching operation, namely, where the next touching operation is not performed even though a measuring time (e.g., 500 msec) by the next-touch wait timer elapses after a tap has been made, the CPU 10 judges that the tap is a single tap. After S608, the CPU 10 executes processing upon dragging (that will be later explained by referring to FIG. 8) (S609) and ends the present processing. Hereinafter, the processing upon dragging will be referred to as the "upon-dragging processing" where appropriate.

Where not the dragging operation but the releasing operation is recognized in the touch-panel processing of FIG. 5 (S606: No, S610: Yes), the CPU 10 sets the dragging wait flag to off (S611). Next, where the next-touch wait flag is set to off (S612: Yes), the CPU 10 executes processing upon releasing (that will be later explained by referring to FIG. 9) (S613) and ends the present processing. Hereinafter, the processing upon releasing will be referred to as the "upon-releasing processing" where appropriate. On the other hand, where the next-touch wait flag is set to on (S612: No), no processing is executed after the releasing operation. In this case, therefore, the CPU 10 ends the present processing.

Where none of the touching operation, the dragging operation, and the releasing operation is recognized in the touch-panel processing of FIG. 5 and the current time point is not end timing of the measurement by the next-touch wait timer (S601: No, S606: No, S610: No, S614: No), the CPU 10 executes, as other processing, processing in accordance with the current state (S620) and ends the present processing.

On the other hand, where the current time point is the end timing of the measurement by the next-touch wait timer, namely, the current time point is timing at which the prescribed time (e.g., 500 msec) has elapsed after initiation of the measurement (S614: Yes), it indicates that an input of a single tap has been established. In this instance, therefore, the CPU 10 sets the next-touch wait flag to off (S615). Subsequently, where an execution command other than "copy data pasting" is being set (S616: No), there exist no processing to be executed at this timing, so that the CPU 10 ends the present processing. In S615, where the execution command that is being set is "copy data pasting" (S616: Yes), the CPU 10 displays the data stored in the copy buffer 12a at a start position (that will be explained with respect to FIG. 7) stored in the RAM 12 (S618) in an instance where the data (the copy data) exists in the copy buffer 12a (S617:Yes), and moves the processing to S619. On the other hand, where there exists no data in the copy buffer 12a (S617: No), the CPU 10 moves the processing to S619. In S619, the CPU 10 clears the execution command (S619) and ends the present processing.

Figure 7:
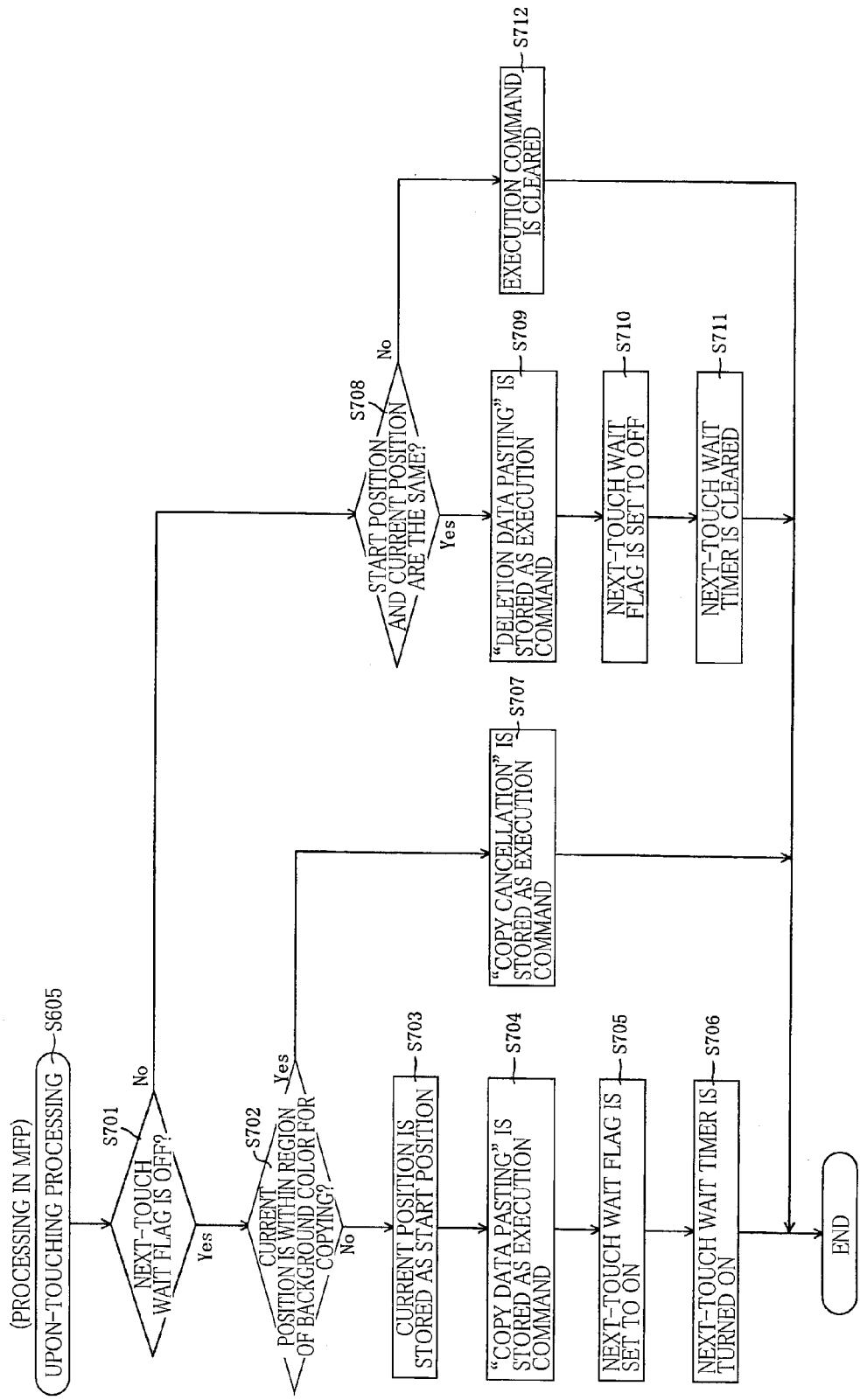
FIG. 7 is a flow chart showing upon-touching processing.

FIG. 7 is a flow chart showing upon-touching processing (S605). Where the next-touch wait flag is off and the current position is within a region of the background color for copying (S701: Yes, S702: Yes), it indicates that the user has touched the range of the background color for copying (i.e., the processing range of the copying processing) to cancel selection of the copying processing. Accordingly, in this instance, the CPU 10 sets "copy cancellation" as the execution command (S707) and ends the present processing. Where "copy cancellation" is set as the execution command in S707, the region of the background color for copying is changed to the original color and the copy buffer 12a is cleared, when the releasing operation is performed. Accordingly, in a case where the user selects an erroneous range as the copy data, the erroneous copy data can be temporarily cleared by touching the region of the background color for copying.

On the other hand, where the current position is outside the range of the background color for copying (S702: No), the CPU 10 stores, in the RAM 12, the current position as the start position (S703). The CPU 10 subsequently sets (S704) "copy data pasting" as the execution command by recognizing that copy data pasting processing has been selected. The CPU 10 then sets the next-touch wait flag to on (S705), turns on the next-touch wait timer (S706), and ends the present processing. The next-touch wait timer which has been turned on in S706 stars measuring a time period (e.g., 500 msec) for accepting an input of a single tap, namely, for recognizing the input of the single tap.

Where the next-touch wait flag is set to on in S701 and the start position stored in the RAM 12 and the current position are the same (S701: No, S708: Yes), the CPU 10 sets "deletion data pasting" as the execution command (S709) by recognizing that deletion data pasting processing has been selected by a double tap. Subsequently, the CPU 10 sets the next-touch wait flag to off (S710), clears the next-touch wait timer (S711), and ends the present processing. On the other hand, where the next-touch wait flag is on and the start position and the current position are mutually different (S701: No, S708: No), the CPU 10 clears the execution command (S712) and ends the present processing.

Figure 8:
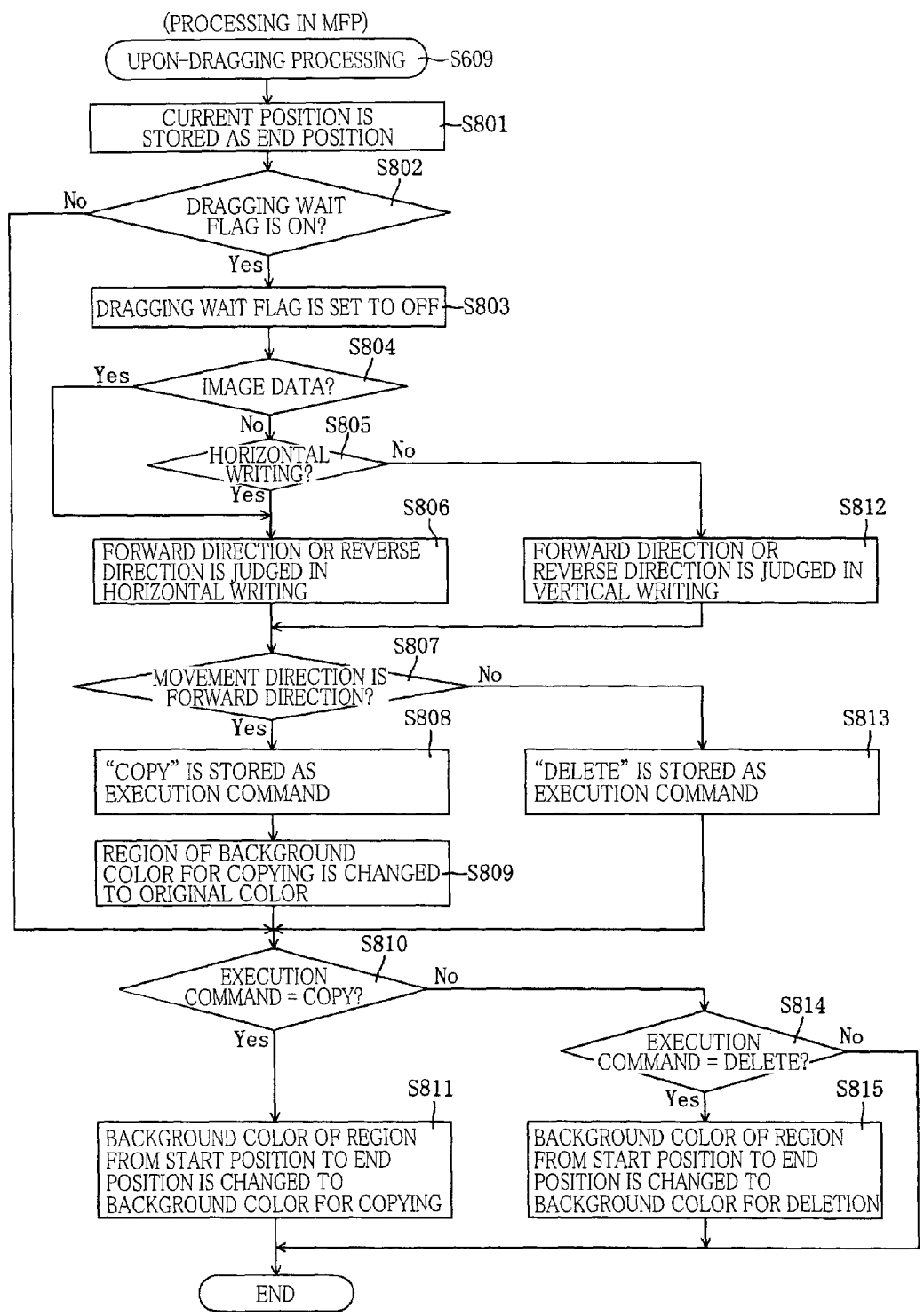
FIG. 8 is a flow chart showing upon-dragging processing.

FIG. 8 is a flow chart showing upon-dragging processing (S609). The CPU 10 stores, in the RAM 12, the current position as an end position (S801). Where the dragging wait flag is on (S802: Yes), the dragging processing is initially executed one after initiation of dragging. In this case, therefore, the CPU 10 executes processing in S803-S809, S812, S813 (that will be later explained) to select processing to be executed with respect to the data as the processing target, on the basis of the movement direction of the dragging (the continuous input) from the start position.

To be specific, the CPU 10 initially sets the dragging wait flag to off (S803). Where the data as the processing target is not the image data but the text data (S804: No), the CPU 10 judges whether the movement direction is the forward direction or the reverse direction in the horizontal writing (S806) in a case where the text data is the horizontal writing (S805: Yes). In other words, the CPU 10 judges the movement direction from the start position by referring to the setting in the case of the horizontal writing in the direction determination table 11b. On the other hand, where the text data is the vertical writing (S805: No), the CPU 10 judges whether the movement direction is the forward direction or the reverse direction in the vertical writing (S812). In other words, the CPU 10 judges the movement direction from the start position by referring to the setting in the case of the vertical writing in the direction determination table 11b. Where the processing target data is the image data (S804: Yes), the CPU 10 moves the processing to S806. That is, where the processing target data is the image data, the CPU 10 judges the movement direction from the start position by referring to the setting in the case of the horizontal writing in the direction determination table 11b.

Next, the CPU 10 judges whether the movement direction detected in S508 (in this case, the movement direction from the start position of the dragging) is the forward direction, on the basis of the direction determination table 11b (S807). Where the CPU 10 judges in S807 that the movement direction is the forward direction (S807: Yes), the CPU 10 sets "copy" as the execution command (S808) because, according to the processing determination table 11c, the processing to be executed when the movement direction is the forward direction is the copying processing. In this instance, the CPU 10 changes the region of the background color for copying to the original color (S809) and moves the processing to S810. In this regard, in an instance where there exists no region of the background color for copying such as an instance where dragging is performed in the forward direction for the first time after initiation of the touch-panel processing of FIG. 5, the CPU 10 skips the processing in S809 and moves the processing to S810. On the other hand, where the CPU 10 judges in S807 that the movement direction is the reverse direction (S807: No), the CPU 10 sets "delete" as the execution command (S813).

Where the execution command that is being set is "copy" (S810: Yes), the CPU 10 changes the color of the region from the start position to the end position into the background color for copying (e.g., yellow) (S811) and ends the present processing. On the other hand, where the execution command that is being set is not "copy" but "delete" (S810: No, S814: Yes), the CPU 10 changes the color of the region from the start position to the end position into the background color for deletion (e.g., blue) (S815) and ends the present processing. By the processing in S811 and S815, the processing range of the copying processing and the processing range of the deletion processing are respectively set. Because the background color of the processing range of the copying processing and the background color of the processing range of the deletion processing are made mutually different, the user can recognize what processing is to be executed with respect to the processing range, on the basis of a display mode such as the background color. The "region from the start position to the end position" in S811 and S815 is a rectangular region in which two apexes of respective two opposite angles respectively correspond to the start position and the end position in an instance where the data as the processing target is the image data. In an instance where the data as the processing target is the text data, a range in which are displayed characters sandwiched between the start position and the end position inclusive corresponds to the "region from the start position to the end position". On the other hand, where the execution command that is being set is neither "copy" nor "delete" (S810: No, S814: No), the CPU 10 ends the present processing.

Where the dragging wait flag is off in S802 (S802: No), the CPU 10 moves the processing to S810. Accordingly, by continuing the dragging after selection of the copying processing or the deletion processing so as to arbitrarily change the end position, it is possible to enlarge or reduce the processing range in accordance with the change of the end position.

FIG. 9 is a flow chart showing upon-releasing processing (S613). Where the execution command that is being set is "copy" (S901: Yes), the CPU 10 stores the data corresponding to an image in the region in accordance with the start position and the end position, as the copy data, in the copy buffer 12a (S902), clears the execution command (S903), and ends the present processing. On the other hand, where the execution command that is being set is "delete" (S901: No, S904: Yes), the CPU 10 stores the data corresponding to the image in the region in accordance with the start position and the end position, as the deletion data, in the deletion buffer 12b, and deletes the data from the LCD 16 (S905, S906). As a result of the deletion of the data, images or characters based on the data in question (i.e., the deletion data) are also erased. Next, the CPU 10 changes the region of the background color for deletion to the original color (S907). In this instance, where the data as the processing target is the text data, the CPU 10 displays characters (subsequent characters) that follow or that exist behind the region from which the data has been deleted (i.e., the processing range), such that the characters are moved forward. Where the data as the processing target is the image data, the CPU 10 adds image data such that an image in a prescribed color is displayed in the region from which the data has been deleted (i.e., the processing range). After the processing in S907, the CPU 10 clears the execution command (S903) and ends the present processing.

Where the execution command that is being set is "deletion data pasting" (S904: No, S908: Yes) and there exists the data (the deletion data) in the deletion buffer 12b (S909: Yes), the CPU 10 displays the data stored in the deletion buffer 12b at the start position (S910), clears the deletion buffer 12b (S911), and moves the processing to S903. On the other hand, where there exists no data in the deletion buffer 12b (S909: No), the CPU 10 moves the processing to S903. Where the execution command that is being set is "copy cancellation" (S908: No, S912: Yes), the CPU 10 changes the region of the background color for copying to the original color (S913), clears the copy buffer 12a (S914), and moves the processing to S903. On the other hand, where the execution command that is being set is not "copy cancellation" (S912: No), the CPU 10 moves the processing to S903.

The above-indicated flow charts of FIGS. 6-9 will be concretely explained by taking FIGS. 4A-4E as examples.

Initially, FIGS. 4A and 4B will be explained. As described above, FIGS. 4A and 4B shows one example of the operation in which the copying processing is executed with respect to the text data in the horizontal writing. In FIG. 4A, when the finger touches the position P1, the CPU 10 recognizes a touching operation to the position P1 in S503 of FIG. 5. In association with the recognition of the touching operation in S503, the CPU 10 executes the processing in S601-S605 of FIG. 6. In the example of FIG. 4A, even where the touching operation is initial one after power-on of the MFP1 or even where processing with respect to other region has been executed before the current touching operation, the next-touch wait flag is set to off in S603, S607, S615, or S710. Accordingly, in the upon-touching processing (S605) of FIG. 7, the CPU 10 makes an affirmative decision (Yes) in the processing in S701 and executes the processing in S702-S706.

Next, in FIG. 4A, when the finger moves from the position P1 to the position P2 in the lower right direction, the CPU 10 recognizes a dragging operation in the lower right direction in S508 in FIG. 5. In association with the recognition of the dragging operation in S508, the CPU 10 executes the processing in S606-S609 in FIG. 6. To be concrete, the CPU 10 sets the next-touch wait flag that has been set to on in S705 to off, clears the next-touch wait timer that has been turned on in S706 (S607, S608), and executes the upon-dragging processing (S609; FIG. 8). In the upon-dragging processing (S609; FIG. 8), because the dragging wait flag has been set to on in S604 in FIG. 6, the CPU 10 makes an affirmative decision (Yes) in the processing in S802 and executes the processing in S803 and steps subsequent thereto. In the example of FIG. 4A, because the data is the text data in the horizontal writing (S804; No, S805; Yes), the CPU 10 judges the movement direction obtained in S507 in FIG. 5 by referring to the settings in the case of the horizontal writing in the direction determination table 11b (S806, S807). In FIG. 4A, because the movement direction is the lower right direction, the CPU 10 judges that the movement direction is the forward direction. That is, the CPU 10 makes an affirmative decision (Yes) in the processing in S807. Accordingly, the CPU 10 executes the processing in S808-S811.

Thereafter, in FIG. 4A, when the finger is released from the position P2, the CPU 10 recognizes a releasing operation in S510 of FIG. 5. In association with the recognition of the releasing operation in S510, the CPU 10 executes the processing in S610 and steps subsequent thereto in FIG. 6. On this occasion, because the next-touch wait flag has been set to off in S607, the CPU 10 makes an affirmative decision (Yes) in the processing in S612 and executes the upon-releasing processing (S613; FIG. 9). In the upon-releasing processing (S613; FIG. 9), because "copy" has been stored as the execution command in S808 in FIG. 8, the CPU 10 makes an affirmative decision (Yes) in the processing in S901. In S902, the CPU 10 stores, in the copy buffer 12a, the data corresponding to an image in the processing range A2 in FIG. 4A (S902).

When the finger has touched the position P3 in FIG. 4B subsequent to the operation performed in FIG. 4A, the CPU 10 recognizes a touching operation of the position P3 in S503 in FIG. 5. In association with the recognition of the touching operation, the CPU 10 executes the processing in S601-S605 in FIG. 6. The position P3 is not present in the region of the background color for copying, namely, the position P3 is outside the processing range A2, so that the CPU 10 makes a negative decision (No) in S702 in FIG. 7 and executes the processing in S702-S706.

Thereafter, when the finger is released from the position P3, the CPU 10 recognizes a releasing operation in S510 in FIG. 5. In association with the recognition of the releasing operation, the CPU 10 executes the processing in S610 and steps subsequent thereto in FIG. 6. On this occasion, because the next-touch wait flag has been set to on in S705 in FIG. 7, the CPU 10 makes a negative decision (No) in S612 and ends the input-screen update processing without executing any processing. Where a single tap is made, the touch panel 17 is not touched immediately after the finger is released from the position P3. Accordingly, when the measurement by the next-touch wait timer that has been turned on in S706 in FIG. 7 is ended after releasing of the finger from the position P3, the CPU 10 makes an affirmative decision (Yes) in S614 in FIG. 6 and executes the processing in S614-S619. On this occasion, because "copy data pasting" has been stored as the execution command in S704 in FIG. 7, the CPU 10 makes an affirmative decision (Yes) in S616 and displays, at the position P3, the data corresponding to the image in the processing range A2 and stored in the copy buffer 12*a* (S618). Accordingly, where the position P3 is single-tapped, the data corresponding to the image in the processing range A2 and stored in the copy buffer 12*a* is displayed at the position P3, as shown in FIG. 4B.

In FIG. 4B, the position P3 is present outside the processing range A2. In an instance where the position P3 is present within the processing range A2, the CPU 10 makes an affirmative decision (Yes) in S702 in FIG. 7 and stores "copy cancellation" as the execution command (S707). When the finger is released from the position P3, the CPU 10 makes an affirmative decision (Yes) in S612 in FIG. 6 because the next-touch wait flag has been set to off, and the CPU 10 executes the upon-releasing processing (S613; FIG. 9). In the upon-releasing processing (S613; FIG. 9), the CPU 10 changes the image in the processing range A2 from the background color for copying to the original color and deletes the data stored in the copy buffer 12*a* (S912-S914).

FIGS. 4C-4E will be explained. As described above, FIGS. 4C-4E show one example of the operation in which the deletion processing is executed with respect to the text data in the horizontal writing. In FIG. 4C, when the finger touches the position P1, the CPU 10 executes the processing in S601-S605 in FIG. 6, as in FIG. 4A. As in FIG. 4A, in the upon-touching processing (S605) in FIG. 7, the CPU 10 executes the processing in S701-S706. Subsequently, in FIG. 4C, when the finger is moved from the position P1 to the position P2 in the upper left direction, the CPU 10 executes the processing in S606-S609 in FIG. 6, as in FIG. 4A. As in FIG. 4A, in the upon-dragging processing (S609) in FIG. 8, the CPU 10 makes an affirmative decision (Yes) in the processing in S802 and executes the processing in S803-807. Unlike the case of FIG. 4A, the movement direction is the upper left direction in the case of FIG. 4C. Accordingly, the CPU 10 judges that the movement direction is the reverse direction. In other words, the CPU 10 makes a negative decision (No) in the processing in S807. Hence, in FIG. 4C, the CPU 10 executes the processing in S813 and S814-S815.

Subsequently, in FIG. 4C, when the finger is released from the position P2, the CPU 10 executes the processing in S610-S613 in FIG. 6, as in FIG. 4A. In the upon-releasing processing (S613; FIG. 9), the CPU 10 makes an affirmative decision (Yes) in the processing in S904 because "delete" has been stored as the execution command in S813 in FIG. 8. In S905, the CPU 10 stores, in the deletion buffer 12*b*, the data corresponding to the image in the processing range A2 in FIG. 4C (S905). In S906, the CPU 10 deletes the data in question (S906). Subsequently, the CPU 10 changes the image in the processing range A2 from the background color to the original color and moves the character "O" that is located behind the processing range A2 (S907) forward. When the processing in S907 is executed, the display state of the LCD 16 becomes to that shown in FIG. 4D.

When the finger has touched the position P3 in FIG. 4E subsequent to the operation performed in FIG. 4C, the CPU 10 executes the operation in S601-S605 of FIG. 6, as in FIG. 4B. When the finger is released from the position P3, the CPU 10 executes the processing in S610-S612 of FIG. 6 and ends the present processing, as in FIG. 4B. When the finger re-touches the position P3 immediately after the finger has been released from the position P3, the CPU 10 executes the processing in S601-S605 of FIG. 6, as in FIG. 4B. However, because the next-touch wait flag has been set to on in S705 of FIG. 7 upon a preceding touching operation, the CPU 10 makes a negative decision (No) in the processing in S701 in the upon-touching processing of FIG. 7. Here, where a double tap in which the same position is tapped twice is made, the CPU 10 judges that the start position (i.e., the position of the first touch) and the current position (the position of the second touch) are the same (S708: Yes) and executes the processing in S709-S711. Thereafter, when the finger is released from the position P3, the CPU 10 makes an affirmative decision (Yes) in the processing in S612 in FIG. 6 because the next-touch wait flag has been set to off in S710 in FIG. 7, and the CPU 10 executes the upon-releasing processing (S613; FIG. 9). In the upon-releasing processing (S613; FIG. 9), the CPU 10 displays, at the position P3, the data corresponding to the image in the processing range A2 and stored in the deletion buffer 12*b* and deletes the data in question from the deletion buffer 12*b* (S908-S911). Therefore, where the position P3 is double-tapped, the data corresponding to the image in the processing range A2 and stored in the deletion buffer 12*b* is displayed at the position P3, as shown in FIG. 4E.

As explained above, according to the present embodiment, where the continuous input (the dragging operation) is detected via the touch panel 17, the processing in accordance with the movement direction of the continuous input from the start position is selected. The thus selected processing is executed with respect to the data in the range identified by the start position and the end position of the continuous input, namely, the data in the processing range. Therefore, the setting of the processing range and the selection of the processing to be executed with respect to the processing range can be made by one dragging operation, namely, by one continuous input, thereby eliminating a need of performing an operation to select the processing apart from the dragging operation and enhancing the operability for execution of desired processing with respect to the data that is being displayed. Accordingly, it is possible to easily correct the image data scanned by the scanner 18 before performing facsimile transmission. Similarly, an image based on the image data received by the facsimile function can be printed by the printer 19 after the image data has been subjected to suitable processing as necessary such as deleting processing of unnecessary data portion.

Further, the processing can be selected depending upon whether the movement direction of the continuous input from the start position is the forward direction or the reverse direction that is opposite to the forward direction, so that the user can select the processing intuitively and the processing can be easily executed. In addition, if the user continues the dragging operation after the copying processing or the deletion processing has been selected for thereby suitably changing the end position, the processing range can be enlarged or reduced, whereby it is possible to set the processing range as desired by the user, after selection of the processing.

Where the releasing operation is detected, namely, where the continuous input is ended, the processing selected based on the movement direction of the continuous input from the start position is executed with respect to the region from the start position to the end position in the continuous input, more specifically, the region to the release position at which the finger is released. Therefore, the user enables the deletion processing of the data to be executed after having confirmed the processing range, whereby the data can be appropriately deleted. Further, the copy data is stored in the copy buffer 12*a* while the deletion data is stored in the deletion buffer 12*b*, and the copy data pasting processing is executed where a single tap is made while the deletion data pasting processing is executed where a double tap is made, after termination of the continuous input, namely, after execution of the copying processing or the deletion processing. Hence, the copy data or the deletion data desired by the user can be displayed (pasted) depending upon an input manner after termination of the continuous input.

In the present embodiment, the MFP 1 is one example of the input device. The control program 11*a* is one example of an input program. The LCD 16 is one example of a display. The flash memory 11 and the RAM 12 constitute one example of a storage. The touch panel 17 is one example of a touch panel and an input acceptance portion. The CPU 10 is one example of a controller. A portion of the CPU 10 that executes the processing in S808 and S813 is one example of a processing selecting portion. A portion of the CPU 10 that executes the processing in S811 and S815 is one example of a processing-range setting portion. A portion of the CPU 10 that executes the processing in S902, S905, and S906 is one example of a processing executing portion. A portion of the CPU 10 that executes the processing in S807 is one example of the direction judging portion. A portion of the CPU 10 that executes the processing in S910 is one example of a second processing executing portion as another processing executing portion. The scanner 18 is one example of a reading portion. The NCU 20 and the modem 21 constitute one example of a transmission and reception portion. A portion of the CPU 10 that executes the processing in S618 is one example of a third processing executing portion as another processing executing portion. A portion of the CPU 10 that executes the processing in S805 is one example of a data identifying portion.

While the embodiment of the present invention has been described, it is to be understood that the present invention is not limited to the details of the embodiment described above, but may be embodied with various other changes and modifications without departing from the spirit and scope of the invention.

In the illustrated embodiment, the present invention is applied to the MFP 1 having the touch panel 17 that enables an input with respect to an image that is being displayed on the LCD 16. The present invention is applicable to any device that enables an input with respect to an image on the display, such as a tablet terminal, a smart phone, and a personal computer to which the display is connected or which has the display. While, in the illustrated embodiment, the input with respect to the image on the display is performed by the touch panel 17, the present invention is applicable to an arrangement in which the input with respect to the image on the display is performed by a pointing device such as a mouse.

In the illustrated embodiment, the copying processing is set in relation to the case in which the movement direction of the continuous input from the start position is the forward direction while the deletion processing is set in relation to the case in which the movement direction is the reverse direction. The copying processing may be set in relation to the case in which the movement direction is the reverse direction while the deletion processing may be set in relation to the case in which the movement direction is the forward direction. The processing to be selected is not limited to the copying processing and the deletion processing as long as the processing can be executable. For instance, there may be set, in relation to the forward direction, processing of changing a color of characters into a prescribed color while there may be set, in relation to the reverse direction, processing of changing the color of characters into a default color. The processing to be selected may differ depending upon the data as the processing target. For instance, for the text data, the copying processing may be set in relation to the forward direction while the deletion processing may be set in relation to the reverse direction. For the image data, processing of expanding the image data may be set in relation to the forward direction while processing, of reducing the image data may be set in relation to the reverse direction. Each data may store processing in relation to the forward direction and processing in relation to the reverse direction, and there may be executed, for each data, processing according to the forward direction or the reverse direction, on the basis of the storage in each data.

In the illustrated embodiment, the copying processing is set in relation to the forward direction while the deletion processing is set in relation to the reverse direction. The processing that is set in relation to one movement direction is not limited one sort of processing, but may be a plurality of sorts of processing. For instance, there may be set, in relation to the forward direction, the copying processing and the processing of changing the color of characters. Further, the number of sorts of the processing set in relation to the forward direction may differ from the number of sorts of the processing set in relation to the reverse direction. A plurality of sorts of processing may be set in relation to one movement direction, and at least one of the plurality of sorts of processing may be executed depending upon a manner of an input to be performed after termination of the continuous input for which the processing has been selected. For instance, where the plurality sorts of processing are set in relation to one movement direction, at least one of the plurality of sorts of processing may be executed in accordance with the number of successive taps on the end position of the continuous input after termination of the continuous input. To be more specific, the copying processing and the deletion processing may be set in relation to the forward direction, for instance. Where the end position of the continuous input is single-tapped after the copying processing and the deletion processing have been selected by one continuous input, the copying processing may be executed. On the other hand, where the end position of the continuous input is double-tapped after the copying processing and the deletion processing have been selected by one continuous input, the deletion processing may be executed. In an instance where the plurality sorts of processing are set in relation to one movement direction, there may be selected processing in accordance with a manner of an input that precedes the continuous input. For instance, where a tap is made and the continuous input is initiated from the tapped position, there may be selected processing in accordance with the number of taps made before the continuous input.

In the illustrated embodiment, the forward direction and the reverse direction are determined on the basis of both of the upward direction and the downward direction; and the leftward direction and the rightward direction. The forward direction and the reverse direction may be determined on the basis of only one of: the upward direction and the downward direction; and the leftward direction and the rightward direction, and the other of: the upward direction and the downward direction; and the leftward direction and the rightward direction may not relate to the selection of the processing to be executed. For instance, one of the leftward direction and the rightward direction may be set as the forward direction while the other of the leftward direction and the rightward direction may be set as the reverse direction, and the upward direction and the downward direction may not relate to the selection of the processing. The oblique direction such as the upper right direction or the upper left direction may be set as the forward direction, and a direction opposite thereto may be defined as the reverse direction. In the illustrated embodiment, prescribed processing is set in relation to the forward direction while another processing is set in relation to the reverse direction. For each of the four directions, i.e., the upward direction, the downward direction, the leftward direction, and the rightward direction, processing may be set. In the illustrated embodiment, the directions each of which is judged to be the forward direction or the reverse direction are stored in the direction determination table 11b with respect to the data in the horizontal writing and the data in the vertical writing. There may be stored directions each of which is judged to be the forward direction or the reverse direction with respect to the data of other kind except the horizontal writing and the vertical writing.

In the illustrated embodiment, when the continuous input is terminated, the processing selected on the basis of the movement direction of the continuous input from the start position is executed with respect to the region from the start position to the end position of the continuous input. Accordingly, where the deletion processing is selected, the data in the region of the background color (the data in the processing range of the deletion processing) upon the releasing operation is deleted altogether, at timing when the releasing operation is detected. Instead, the data in the processing range of the deletion processing may be deleted in order from the start position of the continuous input. Because the data in the processing range is deleted in order from the start position, the deletion processing can be executed while permitting the user to visually check the deletion status, so that good operability is ensured. The arrangement in which the data is deleted in order from the start position of the continuous input may be configured as follows. Every time a dragging operation is detected, the processing range of the deletion processing is updated by setting the current position in the detection in question as an end position. Where the updated processing range is larger than the processing range according to the current position in a dragging operation that has been immediately precedingly detected, in other words, where the updated processing range is larger than the processing range according to a preceding position at which the continuous input has been immediately precedingly accepted, the data corresponding to a difference between the two processing ranges is deleted.

On the other hand, where the deletion processing is selected, every time a dragging operation is detected, the data in the processing range updated by setting the current position in the detection in question as an end position may be stored in the RAM 12. Where the updated processing range is smaller than the processing range according to the current position in a dragging operation that has been immediately precedingly detected, the data that has been deleted and that correspond the difference between the two processing ranges may be displayed. More specifically, the CPU 10 executes the processing in S902 after execution of the processing in S811 and ends the upon-dragging processing of FIG. 8. Further, the CPU 10 executes the processing in S905-S907 after execution of the processing in S815 and ends the upon-dragging processing. In this instance, the processing in S901-S907 in the upon-releasing processing of FIG. 9 is omitted. Accordingly, it is possible to re-display or recover images or characters that have been once deleted. Accordingly, where the user deletes the data excessively, the excessively deleted data can be displayed as it was before by reducing the processing range, so that the deletion processing as desired by the user can be executed. In particular, in a state in which the deletion processing is selected, when the movement direction is changed to the forward direction, namely, when the movement direction is changed to a direction that is not the reverse direction set in relation to the deletion processing, the processing range of the deletion processing can be intuitively adjusted because the updated processing range becomes smaller than the processing range according to the current position in a dragging operation that has been precedingly detected. Hence, when the movement direction is changed to the forward direction in a state in which the deletion processing is selected, it is possible to display the data that has been deleted and that corresponds to the difference between the two processing ranges in order from the current position in the dragging operation that has been precedingly detected, toward the forward direction. Accordingly, the processing range of the deletion processing can be adjusted to a desired range while permitting the user to visually checking the status in which the data that has been deleted is re-displayed, whereby good operability is ensured. In this respect, a portion of the CPU 10 that executes the processing in S902 and S905 in this instance is one example of the storage control portion.

In the illustrated embodiment, as the image data that can be the processing target, the image data scanned by the scanner 18 for facsimile transmission and the image data received by the facsimile transmission are illustrated. There may be employed various image data such as image data received by a device (e.g., a personal computer) connected via the USB_I/F 22. The image data is not limited to the one in the bitmap format, but may be the one that becomes the bitmap format by being decompressed. As the text data that can be the processing target, the text data that becomes an email body part is illustrated. There may be employed various text data such as text data transmitted and received between an external server (such as a cloud server) via the network_I/F 23 or text data received by a device connected via the USB_I/F 22. In the illustrated embodiment, the image data scanned by the scanner 18 for facsimile transmission is dealt with as the image data. The image data may be subjected to character recognition so as to be dealt with as the text data.

In the illustrated embodiment, both of the copy buffer 12a storing the copy data and the deletion buffer 12b storing the deletion data are provided. One buffer storing the copy data and the deletion data may be provided. In this instance, as the input manner for commanding the paste processing, one input manner (e.g., a single tap) may be set. Alternatively, a flag or the like may be utilized to manage as to whether storage contents are the copy data or the deletion data, and the paste processing of the data in the buffer may be executed only when an input corresponding to the storage contents is made. In the illustrated embodiment, deletion of the data and storage of the deleted data in the deletion buffer 12b are executed where an input in the reverse direction is performed. Only deletion of the data may be performed.

What is claimed is:

1. An input device, comprising:
    an input acceptance portion configured to accept an input with respect to an image displayed on a display;
    a storage configured to store a first direction and a second direction with respect to the image displayed on the display, the second direction being perpendicular to the first direction; and
    a controller configured to perform:
        a position determining process in which a start position and an end position on the display are determined based on a continuous input accepted by the input acceptance portion, the start position being a position of the earliest detected input in the continuous input, the end position being a position of the latest detected input in the continuous input;
        a processing region setting process in which a rectangular region having two apexes of opposite angles respectively corresponding to the start position and the end position in the continuous input is set as a processing region, when the start position and the end position are detected in the position determining process;
        a copying-processing executing process in which a copying processing is executed with respect to a part of the image included in the processing region set in the processing region setting process when a movement direction of the continuous input from the start position to the end position is a first oblique direction that is oblique to the first direction and the second direction; and
        a deletion-processing executing process in which a deletion processing is executed with respect to the part of the image included in the processing region when the movement direction of the continuous input from the start position to the end position is a second oblique direction that is an opposite direction of the first oblique direction.

2. The input device according to claim 1,
    wherein, where the input acceptance portion accepts the continuous input, the processing region is updated in the processing region setting process in accordance with a position at which the continuous input is accepted by the input acceptance portion,
    wherein the controller is configured to further perform a storage control process in which the updated processing region is stored every time the processing region is updated in the processing region setting process,
    wherein data corresponding to a difference between: the processing region according to a current position at which the continuous input is being currently accepted; and the processing region according to a preceding position at which the continuous input has been immediately precedingly accepted is deleted in the deletion-processing executing process, in an instance where the processing region according to the current position is larger than the processing region according to the preceding position, and
    wherein the data that has been deleted and that corresponds to the difference is displayed in the deletion-processing executing process, in an instance where the processing region according to the current position is smaller than the processing region according to the preceding position.

3. The input device according to claim 2, wherein, in the processing region setting process, the processing region according to the current position is set so as to be smaller than the processing region according to the preceding position, where the movement direction of the continuous input from the previous position is changed to the first oblique direction.

4. The input device according to claim 2, wherein the data that has been deleted and that corresponds to the difference is displayed in the deletion-processing executing process from the preceding position in order toward the first oblique direction, in an instance where the processing region according to the current position is smaller than the processing region according to the preceding position.

5. The input device according to claim 1, wherein the part of the image included in the processing region is deleted in the deletion-processing executing process when acceptance of the continuous input by the input acceptance portion is ended.

6. The input device according to claim 1,
    wherein, in the deletion-processing executing process, the data corresponding to the part of the image included in the processing region is stored in the storage as deletion data and
    wherein the controller is configured to further perform another processing executing process in which the deletion data corresponding to the part of the image included in the processing region is displayed at a certain position of the display, when the input acceptance portion accepts an input that corresponds to paste processing of the deletion data with respect to the certain position.

7. The input device according to claim 1, further comprising at least one of: a reading portion configured to form image data by reading a document; and a transmission and reception portion configured to transmit and receive image data via a public network,
    wherein, in the deletion-processing executing process, image data is added such that an image in a prescribed color is displayed in the processing region as a result of deletion of the data corresponding to the part of the image included in the processing region.

8. The input device according to claim 1,
    wherein, in the copying-processing executing process, the data corresponding to the part of the image included in the processing region is stored in the storage as copy data, and
    wherein the controller is configured to further perform another processing executing process in which the copy data is displayed at a certain position of the display, when the input acceptance portion accepts an input that corresponds to paste processing of the copy data with respect to the certain position.

9. The input device according to claim 1,
    wherein, in the deletion-processing executing process, the data corresponding to the part of the image included in the processing region is stored as deletion data in the storage,
    wherein, in the copying-processing executing process, the data corresponding to the part of the image included in the processing region is stored as copy data in the storage, wherein the controller is configured to further perform:
a second processing executing process in which the deletion data is displayed at a certain position of the display, when the input acceptance portion accepts an input that corresponds to paste processing of the deletion data at the certain position; and
a third processing executing process in which the copy data is displayed at a certain position of the display, when the input acceptance portion accepts an input that corresponds to paste processing of the copy data with respect to the certain position, and
wherein the input that corresponds to the paste processing of the deletion data and the input that corresponds to the paste processing of the copy data are carried out in mutually different manners.

10. The input device according to claim 1, wherein, in the copying-processing executing process and in the deletion-processing executing process, the part of the image included in the processing region is displayed in a display mode that changes depending upon the copying processing and the deletion processing.

11. The input device according to claim 1, further comprising a touch panel overlaid on the display,
wherein the input acceptance portion is configured to accept an input from the touch panel.

12. The input device according to claim 11, wherein the continuous input is an input in which a position of the touch panel on which a touch is made is moved after detection of the touch, in a state in which the touch is kept detected.

13. The input device according to claim 1,
wherein each of the copying processing and the deletion processing is executed when acceptance of the continuous input by the input acceptance portion is ended.

14. An input device, comprising:
a touch panel overlaid on a display and configured to accept an input to the display;
a storage configured to store a first direction and a second direction with respect to an image displayed on the display, the second direction being perpendicular to the first direction; and
a controller configured to execute a control by receiving signals from the touch panel,
wherein the controller is configured to:
determine a start position and an end position on the display based on a continuous input accepted by the touch panel, the start position being a position of the earliest detected input in the continuous input, the end position being a position of the latest detected input in the continuous input;
set a rectangular region having two apexes of opposite angles respectively corresponding to the start position and the end position in the continuous input as a processing region, when the start position and the end position are detected;
execute a copying processing with respect to a part of the image included in the processing region when a movement direction of the continuous input from the start position to the end position is a first oblique direction that is oblique to the first direction and the second direction; and
execute a deletion processing with respect to the part of the image included in the processing region when the movement direction of the continuous input from the start position to the end position is a second oblique direction that is an opposite direction of the first oblique direction.

15. A non-transitory storage medium in which is stored an input program to be executed by a computer of an input device having an input acceptance portion configured to accept an input with respect to an image displayed on a display and a storage configured to store a first direction and a second direction with respect to the image displayed on the display, the second direction being perpendicular to the first direction, wherein the input program permits the computer to function as a controller to perform:
a position determining process in which a start position and an end position on the display are determined based on continuous input accepted by the input acceptance portion, the start position being a position of the earliest detected input in the continuous input, the end position being a position of the latest detected input in the continuous input;
a processing region setting process in which a rectangular region having two apexes of opposite angles respectively corresponding to the start position and the end position in the continuous input is set as a processing region, when the start position and the end position are detected in the position determining process;
a copying-processing executing process in which a copying processing is executed with respect to a part of the image included in the processing region set in the processing region setting process when a movement direction of the continuous input from the start position to the end position is a first oblique direction that is oblique to the first direction and the second direction; and
a deletion-processing executing process in which a deletion processing is executed with respect to the part of the image included in the processing region when the movement direction of the continuous input from the start position to the end position is a second oblique direction that is an opposite direction of the first oblique direction.

* * * * *